United States Patent [19]
Yashiro

[11] Patent Number: 5,882,757
[45] Date of Patent: Mar. 16, 1999

[54] OPTICAL INFORMATION RECORDING MEDIUM AND METHOD OF PRODUCING THE SAME

[75] Inventor: Toru Yashiro, Yokosuka, Japan

[73] Assignee: Ricoh Company, Ltd., Tokyo, Japan

[21] Appl. No.: 827,045

[22] Filed: Mar. 25, 1997

[30] Foreign Application Priority Data

Dec. 20, 1996 [JP] Japan .................................. 8-355352

[51] Int. Cl.⁶ .......................................................... B32B 3/00
[52] U.S. Cl. ...................... 428/64.1; 428/64.4; 428/64.8; 428/913; 430/270.14; 430/270.17; 430/495.1; 430/945; 369/283; 369/288
[58] Field of Search ................................ 428/64.1, 64.2, 428/64.4, 64.8, 913; 430/270.14, 270.15, 270.16, 270.17, 495.1, 945; 369/283, 288

[56] References Cited

U.S. PATENT DOCUMENTS

| | | |
|---|---|---|
| 5,169,745 | 12/1992 | Yashiro et al. . |
| 5,238,722 | 8/1993 | Yashiro et al. . |
| 5,242,730 | 9/1993 | Yashiro et al. . |
| 5,252,372 | 10/1993 | Yashiro et al. . |
| 5,536,548 | 7/1996 | Yasukama et al. .................... 428/64.1 |

FOREIGN PATENT DOCUMENTS

| | | |
|---|---|---|
| 0418611 | 1/1991 | European Pat. Off. . |
| 0451718 | 10/1991 | European Pat. Off. . |
| 0462368 | 12/1991 | European Pat. Off. . |

*Primary Examiner*—Elizabeth Evans
*Attorney, Agent, or Firm*—Copper & Dunham LLP

[57] ABSTRACT

An optical information recording medium includes a substrate, and a light absorption layer formed thereon which includes a phthalocyanine compound (I) having a thermal decomposition temperature in a range of 250° C. to 350° C., measured by thermogravimetry with a temperature elevation rate of 10° C. and a phthalocyanine compound (II) having a thermal decomposition temperature in a range of 350° C. to 450° C., measured by thermogravimetry with a temperature elevation rate of 10° C. This optical information recording medium can be produced by providing the light absorption layer, directly or via an intermediate layer, on a substrate with information pits and/or guide grooves being on the surface thereof by film formation coating, providing a light reflection layer, directly or via an intermediate layer, on the light absorption layer by vacuum film formation, and providing a protective layer on the light reflection layer.

6 Claims, 5 Drawing Sheets

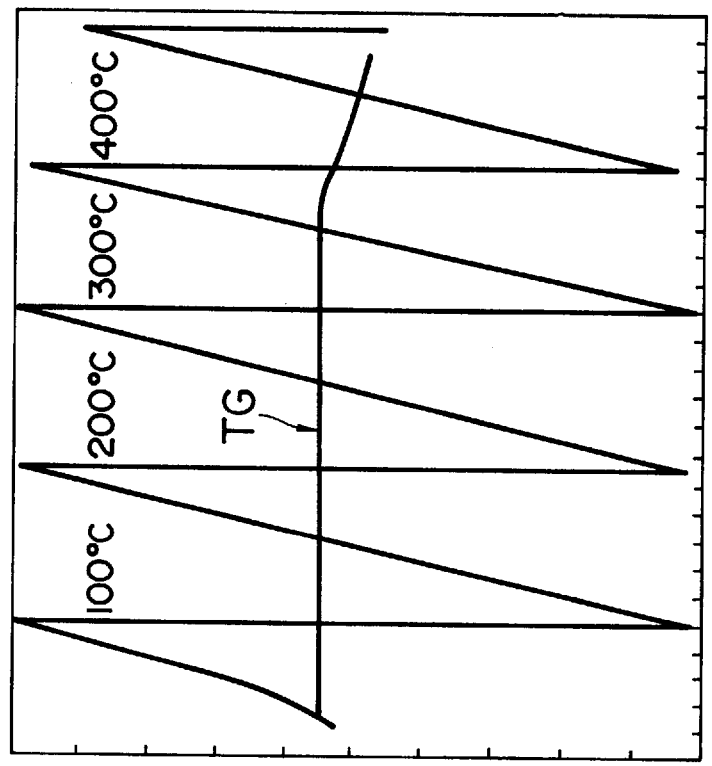
F I G. 1(a)
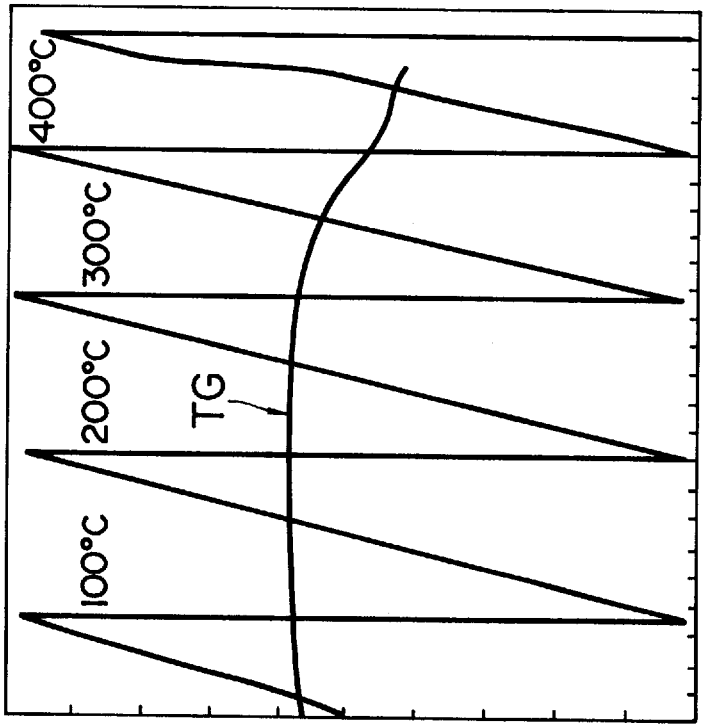
F I G. 1(b)

F I G. 2
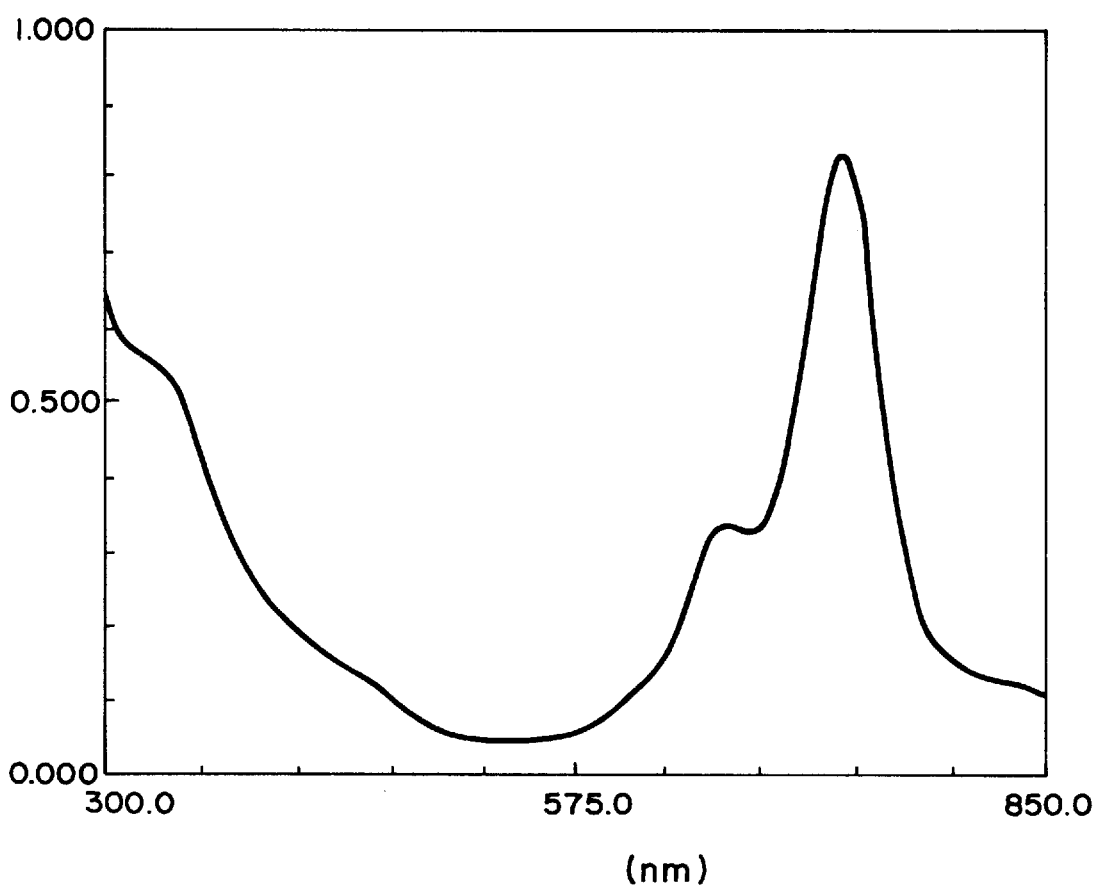

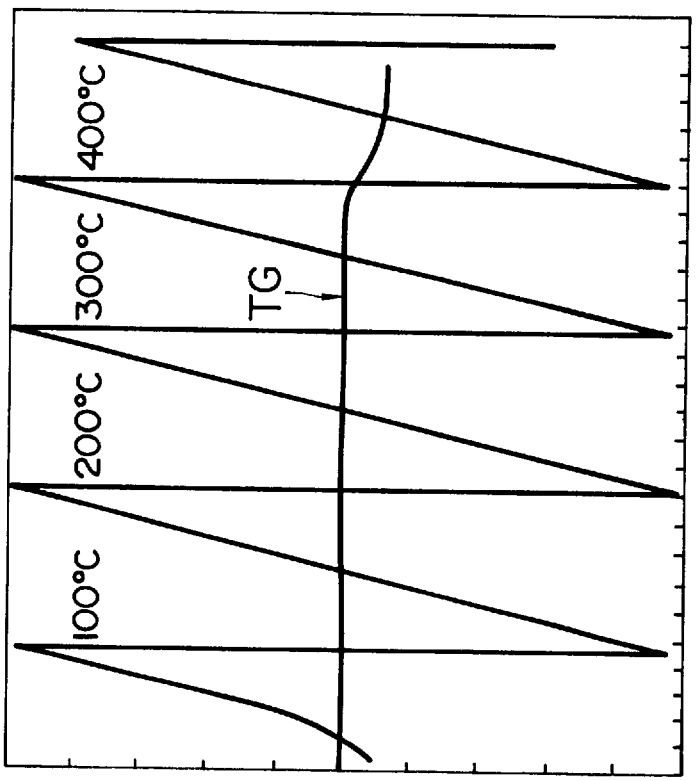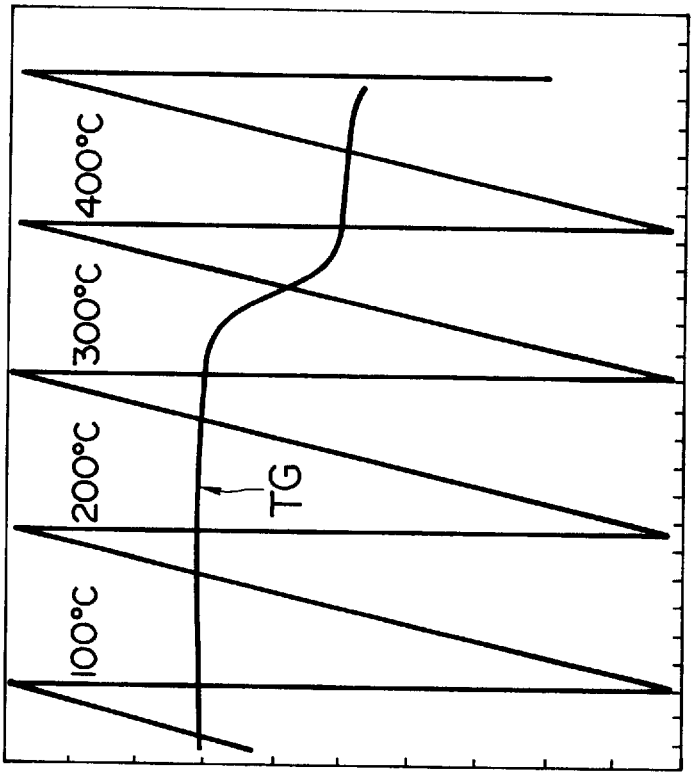

OPTICAL INFORMATION RECORDING MEDIUM AND METHOD OF PRODUCING THE SAME

BACKGROUND OF THE INVENTION

1. Field of the Invention

The present invention relates to an optical information recording medium comprising a substrate and a light absorption layer formed thereon which is capable of absorbing light and comprises (a) a phthalocyanine compound (I) having a thermal decomposition temperature in a range of 250° C. to 350° C., measured by thermogravimetry with a temperature elevation rate of 10° C., and (b) a phthalocyanine compound (II) having a thermal decomposition temperature in a range of 350° C. to 450° C., measured by the same thermogravimetry as with the phthalocyanine compound (I).

2. Discussion of Background

Recently write once read many type CDs (compact disks) have been actively developed. These CDs, unlike conventional CDs, have a feature that user's information can be recorded and recorded information can be reproduced by commercially available CD players, since such write once read many type CDs meet the standards of the conventional CDs.

A recording and reproduction medium of the above-mentioned write once read many type is proposed in Japanese Laid-Open Patent Application 2-42652, which can be fabricated by spin coating a dye on a substrate to provide a light absorption layer on the substrate, and providing a metal reflection layer on the back side of the substrate opposite to the light absorption layer.

Furthermore, Japanese Laid-Open Patent Application 2-132656 discloses that appropriate selection of the complex index of refraction and the thickness of the light absorption layer provides a compact disk which satisfies the CD standards with respect to recorded signals. Such compact disks are now in fact commercialised as write once read many type CDs.

However, write once read many type CDS using dyes as disclosed in Japanese Laid-Open Patent Applications 2-42652 and 2-132656 do not have sufficient light resistance for use in practice and therefore have the shortcoming that the signal characteristics thereof are caused to deteriorate when exposed to sunrays for an extended period of time, and eventually these CDs become unable to satisfy the CD standards.

The above-mentioned problem is considered to be caused by the deterioration of dyes used therein, in particular, conventionally employed cyanine dyes, when the dyes are exposed to light.

In order to minimize the deterioration of such dyes, there has been proposed the addition of a light stabilizer to the light absorption layer as disclosed in Japanese Laid-Open Patent Application 63-159090. However, in the light absorption layer disclosed in Japanese Laid-Open Patent Application 63-159090, when the light stabilizer is added in a small amount, specifically in an amount of less than 20 wt. % of the entire weight of the light absorption layer, sufficient light resistance for use in practice cannot be attained, while when the light stabilizer is added in a large amount, specifically in an amount of more than 20 wt. %, the optical and/or thermal characteristics of the light absorption layer change and various signal characteristics therefore deteriorate.

Japanese Laid-Open Patent Application 3-62878 discloses a highly heat resistant write once and read many type CD, which employs a highly light resistant phthalocyanine compound. More specifically, in the case of this CD, a particular group is introduced into a phthalocyanine compound which is used in the light absorption layer thereof, and such phthalocaynine compound is spin coated, whereby the complex index of refraction of the light absorption layer is appropriately adjusted so as to be suitable for use in the highly heat resistant write once read many type CD. The write once read many type CD disclosed in the above-mentioned Japanese Laid-Open Patent Application 3-62878, however, has the shortcoming that the quality of regenerative signals is inferior to the quality of regenerative signals output from light absorption layers comprising the conventional cyanine dyes. More specifically, the CD disclosed in the above-mentioned Japanese Laid-Open Patent Application 3-62878 has the shortcoming that the signal length (pit length) of each of signals which constitute regenerative signals is apt to deviate from a theoretical intrinsic value of CD signals, and therefore reproduction errors are apt to occur.

SUMMARY OF THE INVENTION

It is therefore a first object of the present invention to provide a highly heat resistant optical information recording medium comprising a light absorption layer in which there is employed a phthalocyanine compound free of the above-mentioned conventional problems concerning regenerative signals.

A second object of the present invention is to provide a method of producing the above-mentioned highly heat resistant optical information recording medium.

The first object of the present invention can be achieved by an optical information recording medium comprising a substrate and a light absorption layer formed thereon which is capable of absorbing light and comprises (a) a phthalocyanine compound (I) having a thermal decomposition temperature in a range of 250° C. to 350° C., which is measured by thermogravimetry with a temperature elevation rate of 10° C. and (b) a phthalocyanine compound (II) having a thermal decomposition temperature in a range of 350° C. to 450° C., which is measured by thermogravimetry with a temperature elevation rate of 10° C.

By use of the above-mentioned phthalocyanine compounds (I) and (II) in combination as the main components for the light absorption layer, excellent signal characteristics can be obtained and the occurrence of reproduction errors is maintained.

The phthalocyanine compound (I) for use in the above optical information recording medium may be a compound of formula (1),

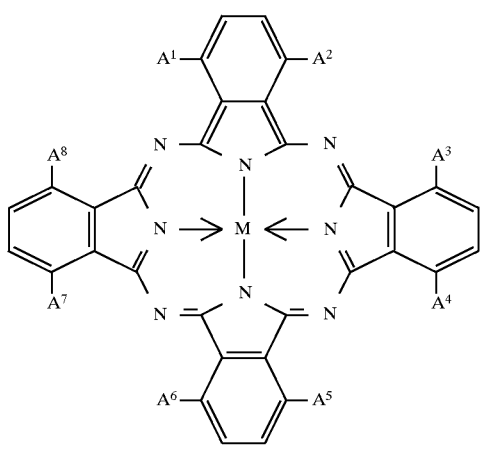

(1)

wherein M is a divalent metal atom, a mono-substituted trivalent metal atom, a di-substituted tetravalent metal or an oxy metal, one of $A^1$ or $A^2$, one of $A^3$ or $A^4$, one of $A^5$ or $A^6$, and one of $A^7$ or $A^8$ are each independently —O—C$(R^1)(R^3)$—$R^2$, and the other in each pair is a hydrogen atom, in which $R^1$ and $R^3$ are each independently an alkyl group, a fluorine-substituted alkyl group, or a hydrogen atom, and $R^2$ is an unsubstituted or substituted phenyl group; and the phthalocyanine compound (II) may be a compound of formula (2),

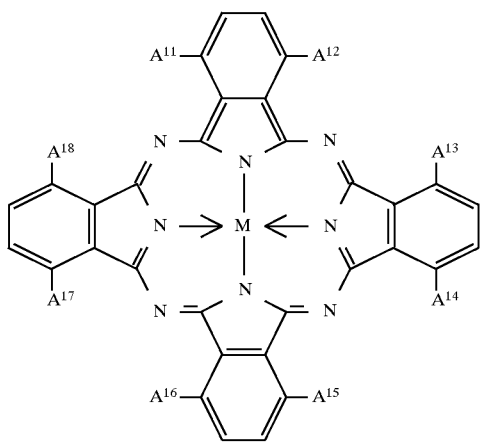

(2)

wherein M is a divalent metal atom, a mono-substituted trivalent metal atom, a di-substituted tetravalent metal or an oxy metal, one of $A^{11}$ or $A^{12}$, one of $A^{13}$ or $A^{14}$, one of $A^{15}$ or $A^{16}$, and one of $A^{17}$ or $A^{18}$ are each independently —S—$R^4$ in which $R^4$ is an unsubstituted or substituted phenyl group, and the other in each of the above pairs is a hydrogen atom.

In the above formulae (1) and (2), it is preferable that the substituted phenyl group represented by $R^2$ be an alkyl-group-substituted phenyl group, and the substituted phenyl group represented by $R^4$ be a alkyl-group-substituted phenyl group.

By use of the above-mentioned specific phthalocyanine compound of formula (1) and phthalocyanine compound of formula (2) in the light absorption layer, it is easy to obtain a light absorption layer with a complex of refractive index necessary for the write once read many type CDs to be used in laser beam wavelength ranges.

It is preferable that the molar ratio of phthalocyanine compound (I) to the phthalocyanine compound (II) in the light absorption layer, that is, (I)/(II), be in a range of 1/3 to 3/1, for obtaining the light absorption layer with a complex of refractive index necessary for the write once read many type CDs to be used in laser beam wavelength ranges.

Furthermore, in the optical information recording medium of the present invention, it is preferable that the light absorbed by the light absorption layer have a light absorption peak wavelength λmax in a range of 710 nm to 750 nm, for obtaining more securely the light absorption layer with a complex of refractive index necessary for the write once read many type CDs to be used in laser beam wavelength ranges.

The second object of the present invention can be achieved by a method of fabricating an optical information recording medium comprising the steps of providing the above-mentioned light absorption layer, directly or via an intermediate layer, on a substrate having information pits and/or guide grooves thereon, by film formation coating, providing a light reflection layer, directly or via an intermediate layer, on the light absorption layer by vacuum film formation, and providing a protective layer on the light reflection layer.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1(a) is a diagram showing the thermal decomposition temperature of the phthalocyanine compound (I) employed in Example 1.

FIG. 1(b) is a diagram showing the thermal decomposition temperature of the phthalocyanine compound (II) employed in Example 1.

FIG. 2 is a graph showing a maximum absorption peak wavelength (λmax) of a light absorption layer of an optical information recording medium No. 1 fabricated in Example 1.

FIG. 3(a) is a graph showing the thermal decomposition temperature of the phthalocyanine compound (I) employed in Example 6.

FIG. 3(b) is a graph showing the thermal decomposition temperature of the phthalocyanine compound (II) employed in Example 6.

DESCRIPTION OF THE PREFERRED EMBODIMENTS

Figure 4:
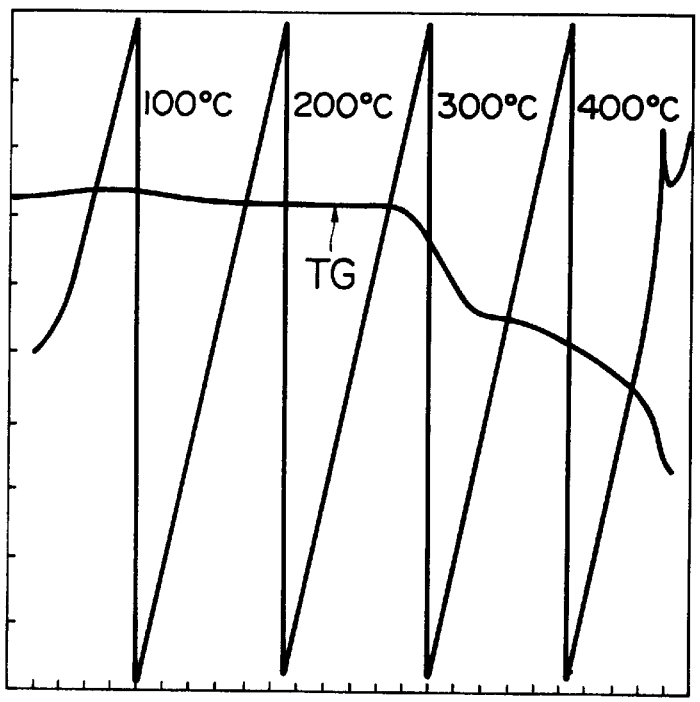
FIG. 4 is a graph showing the thermal decomposition temperature of the phthalocyanine compound (I) employed in Example 13.

An optical information recording medium of the present invention comprises a substrate, and a light absorption layer formed thereon, which is capable of absorbing light and comprises (a) a phthalocyanine compound (I) having a thermal decomposition temperature in a range of 250° C. to 350° C., which is measured by thermogravimetry with a temperature elevation rate of 10° C. and (b) a phthalocyanine compound (II) having a thermal decomposition temperature in a range of 350° C. to 450° C., which is measured by thermogravimetry with a temperature elevation rate of 10° C.

The above-mentioned phthalocyanine compounds (I) and (II) may be phthalocyanine, naphthalocyanine, tetrazaporphine, and derivatives of the aforementioned compounds.

The phthalocyanine compound (I) has a low thermal decomposition temperature and therefore exhibits excellent recording sensitivity with a minimum noise jitter, when used in optical information recording media such as CDS, but has the previously mentioned shortcoming that the signal length (pit length) is apt to deviate from a theoretical intrinsic value of CD signals, and therefore reproduction errors are apt to occur.

On the other hand, the phthalocyanine compound (II) has a high thermal decomposition temperature and therefore is not so good with respect to recording sensitivity and noise jitter, but has the feature that the derivation of the pit length from the theoretical intrinsic value is small.

In the present invention, the term "thermal decomposition temperature" means the TG inflection point of a curve indicating the changes in the weight of a sample compound or the temperature at which the weight of the sample compound changes by 5%, under the application of heat thereto with a temperature elevation rate of 10° C./min, which is measured by a thermobalance, that is, by thermogravimetry.

In the present invention, the phthalocyanine compound (I) and the phthalocyanine compound (II) are used in combination as the main components for the light absorption layer, whereby the characteristics of recording sensitivity, noise jitter and bit length deviation are well balanced.

In order to properly balance the characteristics of recording sensitivity, noise jitter and bit length deviation, it is preferable that the molar ratio of phthalocyanine compound (I) to the phthalocyanine compound (II) in the light absorption layer, that is, (I)/(II), be in a range of 1/3 to 3/1.

In order to minimize the bit length deviation, it is preferable that the thermal weight change rate, that is, the inclination of the curve at the TG inflection point thereof be 0.3 mg/min per 5 mg with respect to both the phthalocyanine compounds (I) and (II).

Examples of the phthalocyanine compound (I) are phthalocyanine compounds with the center metal M thereof being a divalent metal atom, a mono-substituted trivalent metal atom, a di-substituted tetravelent metal or an oxy metal atom, and with the benzene rings thereof being substituted with —OR, —SR, —O—$C_6H_4$—OR, —S—$C_6H_4$—SR (in which R is a straight chain or branched alkyl group), a halogen atom or nitro group.

A preferable example of the phthalocyanine compound (I) is a compound of formula (1),

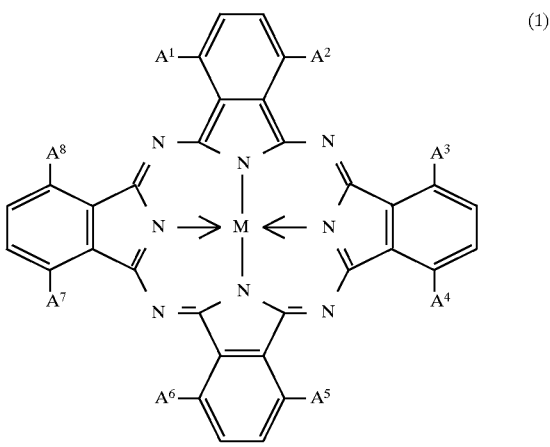

wherein M is a divalent metal atom, a mono-substituted trivalent metal atom, a di-substituted tetravalent metal or an oxy metal, one of $A^1$ or $A^2$, one of $A^3$ or $A^4$, one of $A^5$ or $A^6$, and one of $A^7$ or $A^8$ are each independently —O—C($R^1$)($R^3$)—$R^8$, and the other in each of the above pairs is a hydrogen atom, in which $R^1$ and $R^3$ are each independently an unsubstituted alkyl group, a fluorine-substituted alkyl group, or a hydrogen atom, and $R^2$ is an unsubstituted phenyl group or a substituted phenyl group. It is preferable that the substituted phenyl group represented by $R^2$ be an alkyl-group-substituted phenyl group.

In the phthalocyanine compound of formula (1), when one of $A^1$ or $A^2$, one of $A^3$ or $A^4$, one of $A^5$ or $A^6$, and one of $A^7$ or $A^8$ are each independently a benzyloxy group represented by —O—C($R^1$)($R^3$)—$R^2$, excellent thermal decomposition characteristics represented by the above-mentioned thermal decomposition temperature in a range of 250° C. to 350° C., which is measured by thermogravimetry with a temperature elevation rate of 10° C., are imparted to the phthalocyanine compound of formula (1).

Furthermore, the light absorption peak wavelength λmax can be easily adjusted to a particular wavelength in a range of 710 nm to 750 nm by appropriate selection of a substituent represented by $R^1$ or $R^3$ which may be an alkyl group or a fluorine-substituted alkyl group.

Specific preferable examples of M for the compound of formula (1) are as follows:

[Divalent Metals]
$Cu^{2+}$, $Zn^{2+}$, $Fe^{2+}$, $Co^{2+}$, $Ni^{2+}$, $Ru^{2+}$, $Rh^{2+}$, $Pd^{2+}$, $Pt^{2+}$, $Mn^{2+}$, $Mg^{2+}$, $Ti^{2+}$, $Be^{2+}$, $Ca^{2+}$, $Ba^{2+}$, $Cd^{2+}$, $Mg^{2+}$, $Pb^{2+}$ and $Sn^{2+}$.

[Mono-substituted Trivalent Metals]
Al-Cl, Al-Br, Al-F, Al-I, Ga-Cl, Ga-F, Ga-I, Ga-Br, In-Cl, In-Br, In-I, In-F, Tl-Cl, Tl-Br, Tl-I, Tl-F, Al-$C_6H_5$, Al-$C_6H_4$($CH_3$), In-$C_6H_5$, In-$C_6H_4$($CH_3$), In-$C_{10}H_7$, Mn(OH), Mn(O$C_6H_5$), Mn[OSi($CH_3$)$_3$], FeCl and RuCl.

[Di-substituted Tetravalent Metals]
$CrCl_2$, $SiCl_2$, $SiBr_2$, $SiF_2$, $SiI_2$, $ZrCl_2$, $GeCl_2$, $GeBr_2$, $GeI_2$, $GeF_2$, $SnCl_2$, $SnBr_2$, $SnI_2$, $SnF_2$, $TiCl_2$, $TiBr_2$, $TiF_2$, Si(OH)$_2$, Ge(OH)$_2$, Zr(OH)$_2$, Mn(OH)$_2$, Sn(OH)$_2$, Ti($R^{10}$)$_2$, Cr($R^{10}$)$_2$, Si($R^{10}$)$_2$, Sn($R^{10}$)$_2$ and Ge($R^{10}$)$_2$ wherein $R^{10}$ is an alkyl group, phenyl group, naphthyl group or a derivative of any of the aforementioned groups, Si(O$R^{11}$)$_2$, Sn(O$R^{11}$)$_2$, Ge(O$R^{11}$)$_2$, Ti(O$R^{11}$)$_2$, and Cr(O$R^{11}$)$_2$ wherein $R^{11}$ is an alkyl group, phenyl group, naphthyl group, a trialkyl silyl group, a dialkyl alkoxy silyl group or a derivative of any of the aforementioned group, and Sn(O$R^{12}$)$_2$ and Ge(O$R^{12}$)$_2$ wherein $R^{12}$ is an alkyl group, phenyl group, naphthyl group, or a derivative of any of the aforementioned groups.

[Oxy Metals]

VO, MnO and TiO

Of the above-mentioned center metals for the phthalocyanine compound of formula (I), oxy metals such as VO, MnO and TiO are preferable, in particular, VO is preferable, since the light absorption layer comprising the phthalocyanine compound of formula (I) containing as the center metal M such an oxy metal has high complex index of refraction and high reflectivity.

Specific examples of $R^1$ and $R^3$ are methyl group, ethyl group, propyl group, isopropyl group, n-propyl group, n-butyl group, sec-butyl group, tert-butyl group, $—CF_2$, $—C_2F_5$, $—CF(CF_2)_2$, and a hydrogen atom.

Specific examples of $R^2$ are as follows:

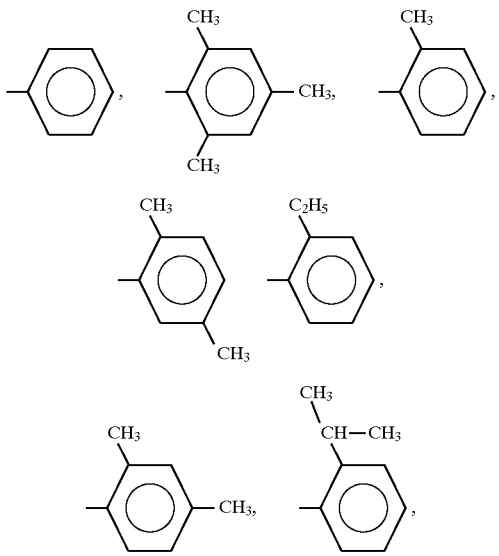

Examples of the phthalocyanine compound (II) are phthalocyanine compounds with the center metal M thereof being a divalent metal atom, a mono-substituted trivalent metal atom, a di-substituted tetravalent metal or an oxy metal, and with the benzene rings thereof being substituted with $—O—C_6H_4—R$ or $—S—C_6H_4—R$ (in which R is a straight chain or branched alkyl group).

A preferable example of the phthalocyanine compound (II) is a compound of formula (2),

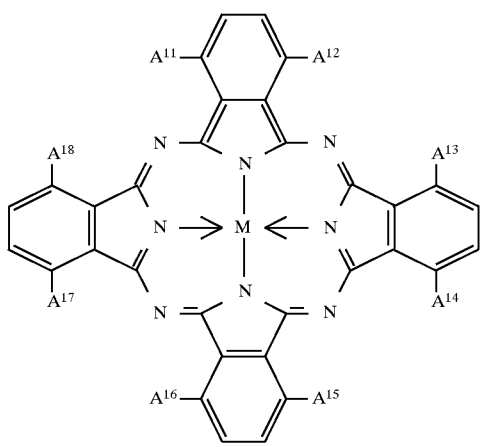

(2)

wherein M is a divalent metal atom, a mono-substituted trivalent metal atom, a di-substituted tetravalent metal or an oxy metal, one of $A^{11}$ or $A^{12}$, one of $A^{13}$ or $A^{14}$, one of $A^{15}$ or $A^{16}$, and one of $A^{17}$ or $A^{18}$ are each independently $—S—R^4$, and the other in each pair is a hydrogen atom, in which $R^4$ is an unsubstituted phenyl group or a substituted phenyl group. It is preferable that the substituted phenyl group represented by $R^4$ be an alkyl-group-substituted phenyl group.

In the phthalocyanine compound of formula (2), when one of $A^{11}$ or $A^{12}$, one of $A^{13}$ or $A^{14}$, one of $A^{15}$ or $A^{16}$, and one of $A^{17}$ or $A^{18}$ are each independently a phenylthio group represented by $—S—R^4$, excellent thermal decomposition characteristics represented by the above-mentioned thermal decomposition temperature in a range of 350° C. to 450° C., which is measured by thermogravimetry with a temperature elevation rate of 10° C., are imparted to the phthalocyanine compound of formula (2), and the light absorption peak wavelength λmax thereof can be adjusted so as to be in a range of 710 nm to 750 nm.

As the center metal M for the phthalocyanine compound of formula (2), the same center metals as for the compound of formula (1) can be employed. Of such center metals M, $Ni^{2+}$, $Cu^{2+}$, $Zn^{2+}$ and $Pd^{2+}$ are particularly preferable, since the phthalocyanine compounds comprising such center metals M have excellent light resistance, and a light absorption layer comprising such a phthalocyanine compound has a light absorption peak wavelength λmax in a range of 710 nm to 750 nm, which makes it easy to obtain the complex index of refraction necessary for fabricating write once read many type CDs.

Specific examples of $R^4$ are as follows:

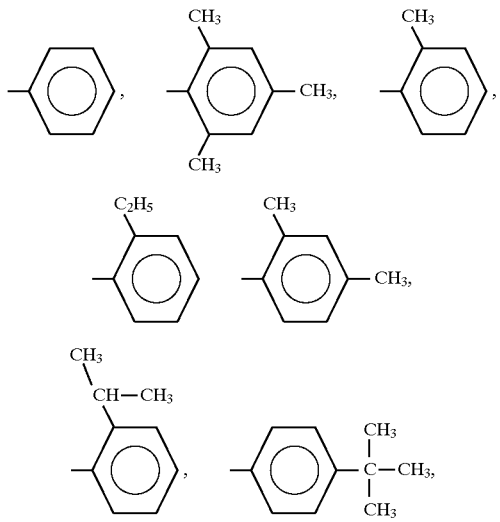

It is preferable that the alkyl group bonded to the above phenyl group as a substituent have 1 to 4 carbon atoms for obtaining appropriate absorbency per unit thickness of the light absorption layer and therefore also for obtaining excellent complex of refraction of the light absorption layer.

The light absorption layer comprising the above-mentioned phthalocyanine compounds (1) and (2) can be provided without difficulty by the steps of dissolving the two compounds in a solvent to prepare a coating liquid and coating the coating liquid on a substrate.

In the case where the compounds (1) and (2) with the center metals M thereof are $Fe^{2+}$, $Co^{2+}$, $Zn^{2+}$, $Cd^{2+}$ or $Mn^{2+}$, it is preferable to add an amino compound to each of the compounds (1) and (2). When the center metal M is any of the above-mentioned metals, the amino compound is easily coordinated with the center metal M, so that the solubilities of the compounds (1) and (2) in solvents are increased by the above coordination and therefore the film formation properties of the compounds (1) and (2) are significantly improved.

Examples of such amino compounds are as follows, but amino compounds for use in the present invention are not limited to the following:

n-butylamine, n-hexylamine, tert-butylamine, pyrrole, pyrrolidine, pyridine, piperidine, purine, imidazole, benzimidazole, 5,6-dimethylbenzimidazole, 2,5,6-trimethylbenzimidazole, napthoimidiazole, 2-methylnaphthoimidazole, quinoline, isoquinoline, quinoxaline, benzquinoline, phenanthridine, indoline, carbazole, norharman, thiazole, benzthiazole, benzoxazole, benztriazole, 7-azaindole, tetrahydro-quinoline, triphenylimidazole, phthalimide, benzoisoquinolin-5,10-dione, triazine, perimidine, 5-chlorotriazole, ethylenediamine, azobenzene, trimethylamine, N,N-dimethylformamide, 1(2H)phthalazinone, phthalhydrazide, 1,3-diimino-isoindoline, oxazole, polyimidazole, polybenzimidazole, and polythiazole.

Of the amine compounds, compounds having heterocyclic rings with N atoms being included in the heterocyclic rings are preferable, since such compounds are capable of hindering the association of the phthalocyanine compounds and such compounds themselves are heat resistant.

Furthermore, it is preferable that the amino compounds for use in the present invention have a melting point of 150° C. or more in order to maintain the thermal stability of the light absorption layer and to prevent the optical characteristics of the light absorption layer at high temperatures and high humidities. In view of the above, imidazole, benzimidazole and thiazole and derivatives thereof are particularly preferable for use in the present invention.

The above-mentioned phthalocyanine compounds of formulae (1) and (2) can be easily synthesized by cyclization of mixtures of their respective corresponding phthalonitrile compounds. To be more specific, the following phthalonitrile of formula (III) and phthalonitrile of formula (IV) are respectively allowed to react with a metal derivative in alcohol, for instance, in the presence of 1,8-diazabicyclo[5,4,0]-7-undecene, with the application of heat thereto.

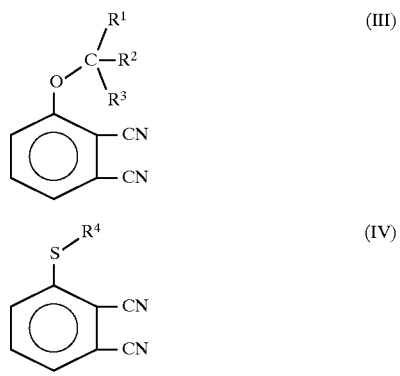

A further substituent group may be introduced into β position of each benzene ring of the phthalocyanine skeleton in order to improve the recording sensitivity, to adjust the absorption wavelength of the light absorption layer, and to improve the solubility in a solvent for coating.

Examples of such substitution groups or atoms are a halogen atom, nitro group, an alkyl group, an alkoxyl group, an aryl group, an alkylthio group, sulfonic acid group, and sulfonic acid amine group.

An optical information recording medium comprising the light absorption layer of the present invention exhibits excellent recording characteristics and signal characteristics because of the thermal decomposition characteristics of the phthalocyanine compounds (I) and (II).

Because of the respective use of the phthalocyanine compound of formula (1) and the phthalocyanine compound of formula (2) as the phthalocyanine compounds (I) and (II), excellent thermal decomposition characteristics are obtained. Furthermore, since the maximum absorption peak wavelength (λmax) is in a range of 710 nm to 750 nm due to the electronic effects of $A^1$ to $A^8$ and $A^{11}$ to $A^{18}$, the complex index of refraction necessary for write once read many type CDs can be obtained.

Dyes used as recording materials in conventional information recording materials can also be added as light absorbing materials to the above-mentioned phthalocyanine compounds (I) and (II).

Examples of such dyes are cyanine dyes, pyrylium.thipyrylium dyes, azulenium dyes, squalilium dyes, metal complex dyes such as Ni, Cr complex dyes, naphthoquinone.anthraquinone dyes, indophenol dyes, indoaniline dyes, triphenylmethane dyes, triarylmethane dyes, aminium.immonium dyes and nitroso compounds.

Further, when necessary, third components such as binders and stabilizers can also be added.

It is preferable that the light absorption layer have a thickness of 100 to 5,000 Å, more preferably a thickness of 500 to 3000 Å, to obtain appropriate recording sensitivity and reflectivity.

Examples of the materials for the substrate for the optical recording medium of the present invention are acrylic resins such as polymethyl methacrylate; vinyl chloride resins such as polyvinyl chloride and vinyl chloride copolymer; epoxy resin; polycarbonate; amorphous polyolefin; polyester; glass such as soda glass; and ceramics. In particular, from the viewpoints of dimensional stability, transparency and flatness, as the materials for the substrate, polymethyl methacrylate, polycarbonate resin, amorphous polyolefin, polyester and glass are preferable for use in the present invention.

In order to improve the flatness and adhesiveness of the surface of the substrate and also to prevent the deterioration of the surface of the substrate, an undercoat layer may be provided between the light absorption layer and the substrate.

Examples of the materials for the undercoat layer are polymers such as polymethyl methacrylate, acrylic acid/methacrylic acid copolymer, styrene/maleic anhydride copolymer, polyvinyl alcohol, N-methylol acrylic amide, styrene/sulfonic acid copolymer, styrene/vinyltoluene copolymer, chlorosulfonated polyethylene, nitrocellulose, polyvinyl chloride, chlorinated polyolefin, polyester, polyimide, vinyl acetate/vinyl chloride copolymer, polyethylene, polypropylene and polycarbonate; organic materials such as silane coupling agents; and inorganic materials, for example, inorganic acids such as $SiO_2$ and $Al_2O_3$, and inorganic fluorine compounds such as $MgF_2$.

It is preferable that the undercoat layer have a thickness in the range of 0.005 μm to 20 μm, more preferably in the range of 0.01 μm to 10 μm.

On the surface of the substrate or the undercoat layer, there may be provided a pregroove layer in the form of concave or convex grooves for tracking or for showing address signals. As the material for the pregroove layer, there can be employed a mixture of at least one monomer or oligomer selected from the group consisting of monoacrylate, diacrylate, triacrylate, and tetraacrylate and a photopolymerization initiator.

Furthermore, on the light absorption layer, there may be provided a reflection layer for improvement of S/N ratio and reflectivity of the optical information recording medium, and also for improvement of the recording sensitivity thereof.

As the material for the reflection layer, there is employed a light reflection material having high reflectivity to laser beams.

Specific examples of such light reflection materials are metals and semi-metals such as Mg, Se, Y, Ti, Zr, Hf, V, Nb, Ta, Cr, Mo, W, Mn, Re, Fe. Co, Ni, Ru, Rh, Pd, Ir, Pt, Cu, Ag, Au, Zn, Cd, Al, Ca, In, Si, Ge, Te, Pb, Po, Sn and Si.

Of the above-mentioned light reflection materials, Au, Al and Ag are particularly preferable for use in the present invention. The above-mentioned materials can be used alone, in combination or in the form of alloys.

It is preferable that the light reflection layer have a thickness in the range of 100 Å to 3000 Å.

The light reflection layer may be interposed between the substrate and the light absorption layer. In this case, recording and reproduction of information are conducted on the side of the light absorption layer which is disposed opposite to the substrate with respect to the light reflection layer.

Furthermore, a protective layer may be provided on the light absorption layer or on the reflection layer in order to protect the light absorption layer or the reflection layer physically or chemically.

Such a protective layer may also be provided on the side of the substrate on which the light absorption layer is not provided in order to improve the scratch resistance and humidity resistance of the optical information recording medium of the present invention.

As the materials for the protective layer, for example, inorganic materials such as SiO, $SiO_2$, $MgF_2$ and $SnO_2$, thermoplastic resin, thermosetting resin, and UV curing resin can be employed.

It is preferable that the protective layer have a thickness in the range of 500 Å to 50 μm.

A method of producing the optical information recording medium of the present invention will now be explained.

The method of producing the optical information recording medium comprising the steps of:

providing the above-mentioned light absorption layer, directly or via an intermediate layer, on the substrate with information pits and/or guide grooves being on the surface thereof, by film formation coating, the light absorption layer being capable of absorbing light and comprising (a) the phthalocyanine compound (I) having a thermal decomposition temperature in a range of 250° C. to 350° C., which is measured by thermogravimetry with a temperature elevation rate of 10° C. and (b) the phthalocyanine compound (II) having a thermal decomposition temperature in a range of 350° C. to 450° C., which is measured by thermogravimetry with a temperature elevation rate of 10° C., providing the light reflection layer, directly or via an intermediate layer, on the light absorption layer by vacuum film formation, and providing the protective layer on the light reflection layer.

Provision of Light Absorption Layer

In the method of producing the optical information recording medium of the present invention, the above-mentioned light absorption layer comprising as the main components the phthalocyanine compound (I) and the phthalocyanine compound (II) is provided, directly or via an intermediate layer, on the substrate with information pits and/or guide grooves being formed on the surface thereof, by film formation coating.

More specifically, the phthalocyanine compound (I) and the phthalocyanine compound (II) are dissolve in a solvent, whereby a light absorption layer formation liquid is prepared.

The thus prepared light absorption layer formation liquid is then coated on the substrate. As the solvent for preparing the light absorption layer formation liquid, conventional organic liquids such as alcohol, cellosolve, halogenated hydrocarbon, ketone and ether can be employed.

As the film formation coating method for providing the light absorption layer, the spin coating method is preferable because the thickness of the light absorption layer can be easily controlled by adjusting the concentration and viscosity of the light absorption layer formation liquid, and the drying temperature of the coated light absorption layer formation liquid.

The above-mentioned undercoat layer is provided on the side of the substrate on which the light absorption layer is provided in order to improve the flatness and adhesion of the substrate, and also to prevent the deterioration of the light absorption layer.

The undercoat layer can be provided by the steps of dissolving the previously mentioned material for the undercoat layer in an appropriate solvent to prepare an undercoat layer formation liquid, and coating the thus prepared undercoat layer formation liquid on the surface of the substrate by a coating method such as spin coating, dip coating or extrusion coating.

Provision of Light Reflection Layer

In the present invention, the light reflection layer is provided, directly or via an intermediate layer, on the light absorption layer by vacuum film formation. More specifically, any of the previously mentioned materials for the light reflection layer is deposited on the light absorption layer, for instance, by vacuum deposition, sputtering or ion plating.

Provision of Protective Layer

In the present invention, the protective layer is provided on the light reflection layer. More specifically, the previously mentioned materials for the protective layer are deposited on the light reflection layer, for instance, by vacuum film deposition or film coating. As the material for the protective layer, UV curing resin is preferable. A protective layer composed of UV curing resin is formed, for instance, by the steps of coating UV curing resin on the light reflection layer by spin coating, and curing the coated UV curing resin with irradiation of ultraviolet rays.

Other features of this invention will become apparent in the course of the following description of exemplary embodiments, which are given for illustration of the invention and are not intended to be limiting thereof.

EXAMPLE 1

On a polycarbonate disk with a diameter of 120 mm and a thickness of 1.2 mm, with guide grooves with a depth of about 1500 Å being formed on the surface thereof in the form of concave and convex patterns, serving as a substrate, a light absorption layer with a thickness of about 1500 Å was formed.

More specifically, the light absorption layer was formed as follows:

A mixture of the phthalocyanine compound (I) and the phthalocyanine compound (II) with a mixing molar ratio of 1/1 (phthalocyanine compound (I)/phthalocyanine compound (II)) in Example 1 in TABLE 1, and 5,6-dimethylbenzimidazole (hereinafter referred to the amino compound) in an amount corresponding to 0.75 in terms of the molar ratio of 5,6-dimethylbenzimidazole to the mixture of the two phthalocyanine compounds (I) and (II), that is, the molar ratio of the amino compound/the phthalocyanine compound (I)+the phthalocyanine compound (II), was dissolved in a mixed solvent of tetrahydrofuran, 1-methoxy-2-butanol and ethylcyclohexane to prepare a light absorption layer formation liquid.

The thus prepared light absorption layer formation liquid was spin coated on the above-mentioned polycarbonate disk, whereby the light absorption layer was formed on the substrate.

The thermal decomposition temperature of the phthalocyanine compound (I) was about 290° C. and that of the phthalocyanine compound (II) was about 390° C., when measured by a commercially available thermal analyzer (Trademark "TG8110, TAS100" made by Rigaku Denki Company, Ltd.), as respectively shown in FIG. 1(a) and FIG. 1(b).

The maximum absorption peak wavelength (λmax) of the above light absorption layer was about 730 nm as shown in FIG. 2 when measured by a commercially available spectrophotometer (Trademark "UV-3100" made by Shimadzu Seisakusho Ltd.).

A light reflection layer with a thickness of about 800 Å was formed on the light absorption layer by sputtering Au.

A protective layer composed of a UV curing resin with a thickness of about 5 μm was provided on the above light reflection layer, whereby an optical information recording medium No. 1 of the present invention was fabricated.

EFM signals were recorded on the thus fabricated optical information recording medium No. 1 and the recorded EFM signals were reproduced therefrom, using a laser beam with a wavelength of 785 nm under the conditions that N.A. was 0.5 and the line speed thereof was 1.2 m/sec. The result was that the reflectivity (Itop) was 70% and that CI error was 220 or less.

The pit lengths of the reproduced signals were measured by an interval analyzer. The result was that the deviation of the pit lengths from the standard CD (Test 5B) was 40 ns or less. This value satisfies the write once read many CD standards (Orange Book).

EXAMPLES 2 TO 18

The procedure of the fabrication of the optical information recording medium No. 1 in Example 1 was repeated except that the phthalocyanine compounds (I) and (II) employed in Example 1 were respectively replaced by the phthalocyanine compounds (I) and (II) in Examples 2 to 17 shown in TABLE 1, whereby optical information recording media Nos. 2 to 17 of the present invention were fabricated.

The thus fabricated optical information recording media Nos. 2 to 17 were evaluated in the same manner as in Example 1. The results are shown in TABLE 2, which indicate that with respect to each of the optical information recording media Nos. 2 to 17, the maximum absorption peak wavelength (λmax) thereof was in the range of 710 nm to 750 nm, and Itop, CI error and the deviation of the pit length thereof satisfy the write once read many type CD standards.

FIG. 3(a) shows the results of the thermal analysis of the phthalocyanine compound (I) employed in Example 6.

FIG. 3(b) shows the results of the thermal analysis of the phthalocyanine compound (II) employed in Example 6.

FIG. 4 shows the results of the thermal analysis of the phthalocyanine compound (I) employed in Example 13.

Figure 5:
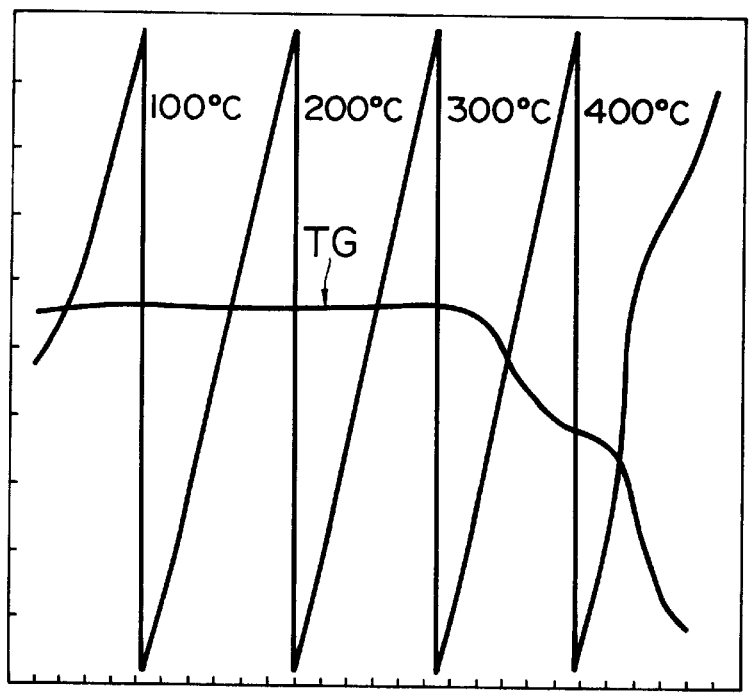
FIG. 5 is a graph showing the thermal decomposition temperature of the phthalocyanine compound (I) employed in Example 17.

FIG. 5 shows the results of the thermal analysis of the phthalocyanine compound (I) employed in Example 17.

COMPARATIVE EXAMPLES 1 TO 4

The procedure of the fabrication of the optical information recording medium No. 1 in Example 1 was repeated except that the phthalocyanine compounds (I) and (II) employed in Example 1 were replaced by the respective phthalocyanine compound (I) in Comparative Examples 1 to 4 shown in TABLE 2, whereby comparative optical information recording media Nos. 1 to 4 of the present invention were fabricated.

The thus fabricated comparative optical information recording media Nos. 1 to 4 were evaluated in the same manner as in Example 1. The results are shown in TABLE 2, which indicate that with respect to each of the comparative optical information recording media Nos. 1 to 4, the maximum absorption peak wavelength (λmax) thereof was in the range of 710 nm to 750 nm, but the characteristics of the reproduced signals did not satisfy the write once read many type CD standards. In particular, the deviation of the pit length thereof was–60 ns or less and fell outside the standards thereof.

Figure 6:
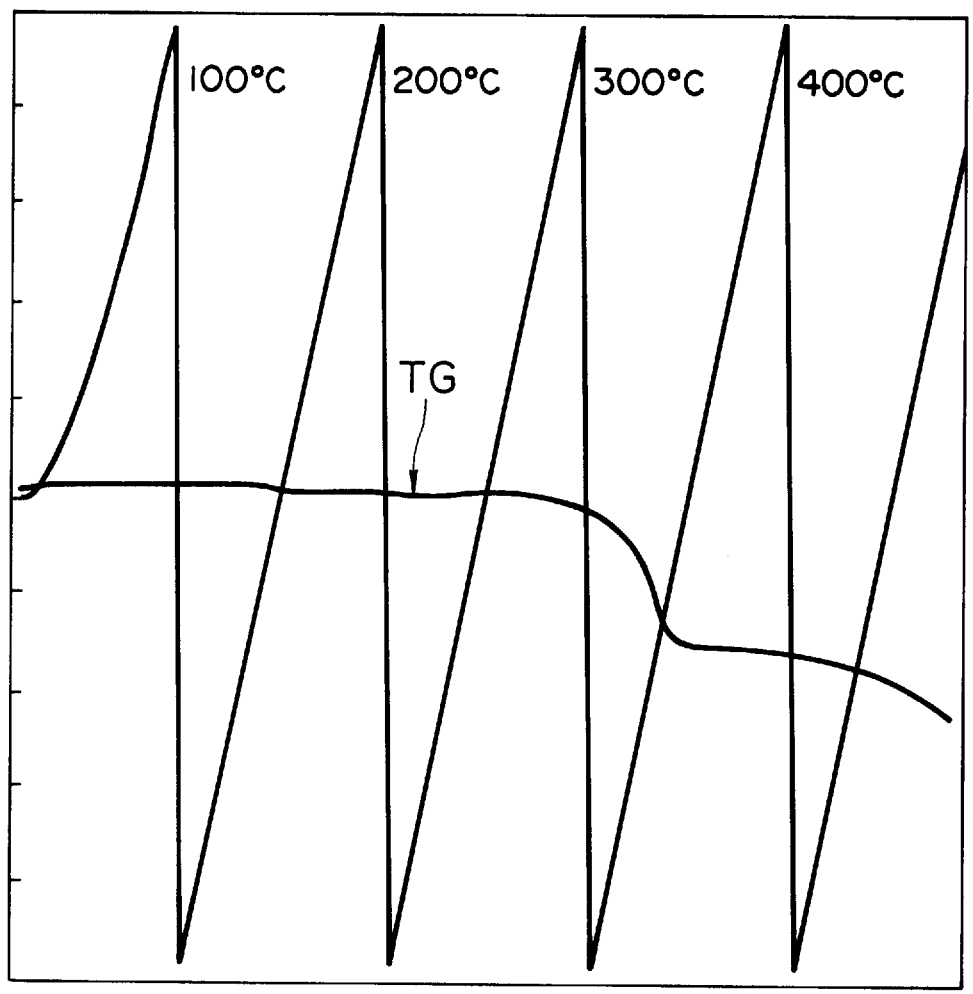
FIG. 6 is a graph showing the thermal decomposition temperature of the phthalocyanine compound (I) employed in Comparative Example 4.

FIG. 6 shows the results of the thermal analysis of the phthalocyanine compound (I) employed in Comparative Example 4.

TABLE 3

| | Phthalocyanine Compound (I) | | | Phthalocyanine Compound (II) | | | Ratio |
|---|---|---|---|---|---|---|---|
| | M | A | TDT* | M | A | TDT* | (I)/(II) |
| Ex. 1 | VO | —O—C(CF$_3$)(H)—(phenyl) | 290° C. | Zn | —S—(2,4,6-tri-CH$_3$-phenyl) | 390° C. | 1/1 |

TABLE 3-continued
| | Phthalocyanine Compound (I) | | | Phthalocyanine Compound (II) | | | Ratio |
|---|---|---|---|---|---|---|---|
| | M | A | TDT* | M | A | TDT* | (I)/(II) |
| Ex. 2 | VO | 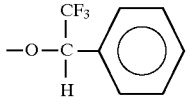 | 290° C. | Zn | 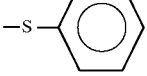 | 375° C. | 1/1 |
| Ex. 3 | VO | 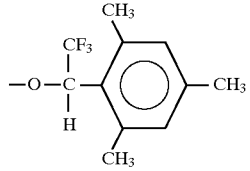 | 330° C. | Zn | 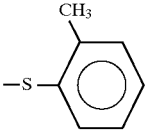 | 400° C. | 1/1 |
| Ex. 4 | VO | 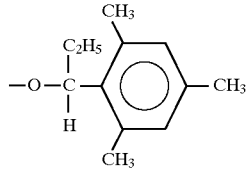 | 305° C. | Zn | 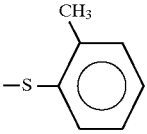 | 400° C. | 1/1 |
| Ex. 5 | VO | 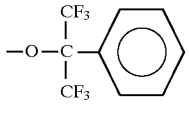 | 280° C. | Zn | 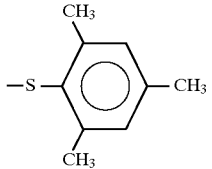 | 390° C. | 1/1 |
| Ex. 6 | Zn | 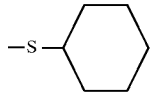 | 340° C. | Zn | 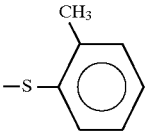 | 400° C. | 1/1 |
| Ex. 7 | Zn | 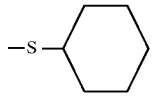 | 340° C. | Zn | 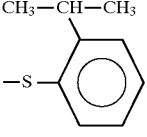 | 375° C. | 1/1 |
| Ex. 8 | Zn | 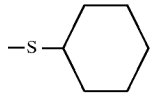 | 340° C. | Zn | 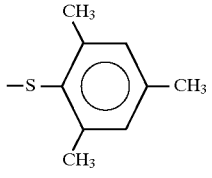 | 390° C. | 1/1 |
| Ex. 9 | Zn | 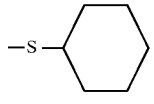 | 340° C. | Zn | 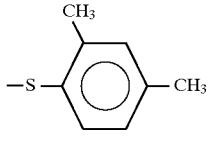 | 385° C. | 1/3 |
| Ex. 10 | Zn | 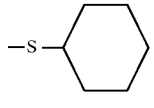 | 340° C. | Zn | 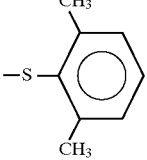 | 385° C. | 1/1 |

TABLE 3-continued

| | Phthalocyanine Compound (I) | | | Phthalocyanine Compound (II) | | | Ratio |
| --- | --- | --- | --- | --- | --- | --- | --- |
| | M | A | TDT* | M | A | TDT* | (I)/(II) |
| Ex. 11 | Zn | —S—C(H)(CH₃)(CH₂)₅CH₃ 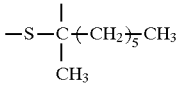 | 320° C. | Zn | —S—C₆H₃(CH₃)₂ (2,4-dimethylphenylthio)  | 385° C. | 1/3 |
| Ex. 12 | Zn | —S-adamantyl  | 340° C. | Zn | —S—C₆H₃(CH₃)₂ 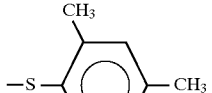 | 385° C. | 1/1 |
| Ex. 13 | Zn | —S-trimethylnorbornyl 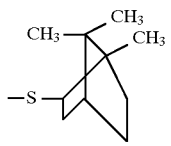 | 285° C. | Zn | —S—C₆H₃(CH₃)₂ 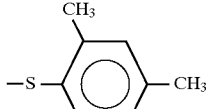 | 385° C. | 1/1 |
| Ex. 14 | Zn | —O—CH[CH(CH₃)₂]₂ | 300° C. | Zn | —S—C₆H₃(CH₃)₂ 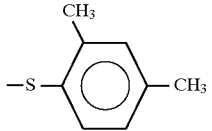 | 385° C. | 1/1 |
| Ex. 15 | Zn | —O—CH[CH(CH₃)₂]₂ | 300° C. | Zn | —S—C₆H₃(CH₃)(Br) 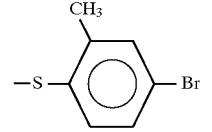 | 375° C. | 1/1 |
| Ex. 16 | Zn | —O—CH[CH(CH₃)₂]₂ | 300° C. | Cu | —S—C₆H₂(CH₃)₃ 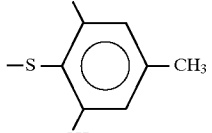 | 375° C. | 1/1 |
| Ex. 17 | Cu | —O—CH[CH(CH₃)₂]₂ | 330° C. | Zn | —S—C₆H₂(CH₃)₃ 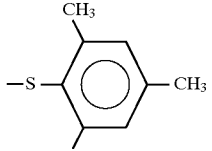 | 375° C. | 1/1 |
| Comp. Ex. 1 | Zn | —S-cyclohexyl 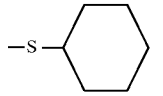 | 340° C. | | | | |
| Comp. Ex. 2 | Zn | —S-trimethylnorbornyl 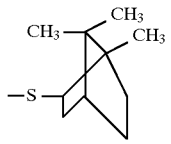 | 285° C. | | | | |
| Comp. Ex. 3 | Cu | —O—CH[CH(CH₃)₂]₂ | 330° C. | | | | |
| Comp. Ex. 4 | Pd | —O—CH[CH(CH₃)₂]₂ Bromide | 325° C. | | | | |

TDT: Thermal Decomposition Temperature

TABLE 4

| | λmax (nm) | Itop (%) | CI Error | Deviation of Pit Length | Amino Compound (mol/dye(s)) |
|---|---|---|---|---|---|
| Ex. 1 | 730 | 70 | ○ | not more than ±40 | DMBi (0.75 mol) |
| Ex. 2 | 728 | 68 | ○ | not more than ±40 | DMBi (0.75 mol) |
| Ex. 3 | 729 | 68 | ○ | not more than ±40 | DMBi (0.75 mol) |
| Ex. 4 | 726 | 68 | ○ | not more than ±40 | DMBi (0.75 mol) |
| Ex. 5 | 725 | 73 | ○ | not more than ±40 | DMBi (0.75 mol) |
| Ex. 6 | 725 | 67 | ○ | not more than ±40 | DMBi (1.5 mol) |
| Ex. 7 | 725 | 68 | ○ | not more than ±40 | DMBi (1.5 mol) |
| Ex. 8 | 728 | 70 | ○ | not more than ±40 | DMBi (1.5 mol) |
| Ex. 9 | 728 | 67 | ○ | not more than ±40 | DMBi (1.5 mol) |
| Ex. 10 | 727 | 69 | ○ | not more than ±40 | DMBi (1.5 mol) |
| Ex. 11 | 728 | 67 | ○ | not more than ±40 | DMBi (1.5 mol) |
| Ex. 12 | 726 | 66 | ○ | not more than ±40 | DMBi (1.0 mol) |
| Ex. 13 | 726 | 70 | ○ | not more than ±40 | DMBi (1.0 mol) |
| Ex. 14 | 729 | 78 | ○ | not more than ±40 | DMBi (1.0 mol) |
| Ex. 15 | 729 | 76 | ○ | not more than ±40 | Nai (1.0 mol) |
| Ex. 16 | 726 | 69 | ○ | not more than ±40 | TMBi (0.75 mol) |
| Ex. 17 | 726 | 69 | ○ | not more than ±40 | TMBi (0.75 mol) |
| Comp. Ex. 1 | 722 | 64 | ○ | −60 (11 T Pit Length) | DMBi (1.0 mol) |
| Comp. Ex. 2 | 721 | 69 | X | −80 (11 T Pit Length) | DMBi (1.0 mol) |
| Comp. Ex. 3 | 725 | 72 | X | −75 (11 T Pit Length) | None |
| Comp. Ex. 4 | 730 | 77 | ○ | −70 (11 T Pit Length) | None |

○: 220 or less
X: more than 220
DMBi: 5,6-dimethylbenzimidazole
TMBi: 2,5,6-trimethylbenzimidazole
Nai: naphthoimidazole Japanese Patent Application No. 08-355352 filed Dec. 20, 1996 is hereby incorporated by reference.

What is claimed is:

1. An optical information recording medium comprising:
   a substrate, and
   a light absorption layer formed on said substrate, said light absorption layer being capable of absorbing light and comprising (a) a phthalocyanine compound (I) having a thermal decomposition temperature in a range of 260° C. to 350° C., measured by thermogravimetry with a temperature elevation rate of 10° and (b) a phthalocyanine compound (II) having a thermal decomposition temperature in a range of 350° C. to 450° C., measured by thermogravimetry with a temperature elevation rate of 10° C., wherein said phthalocyanine compound (I) is a compound of formula (1),

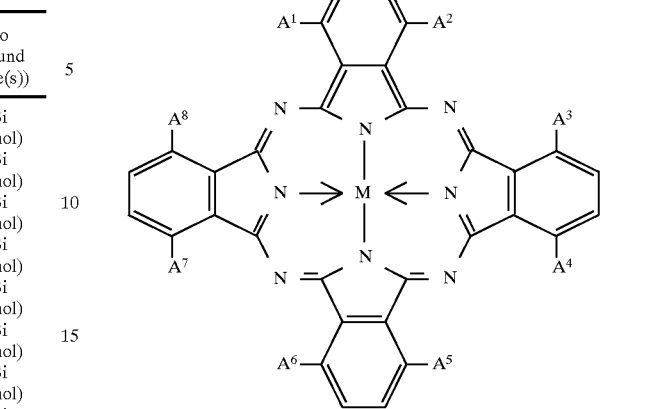

wherein M is a divalent metal atom, a mono-substituted trivalent metal atom, a di-substituted tetravalent metal or an oxy metal, one of $A^1$ or $A^2$, one of $A^3$ or $A^4$, one of $A^5$ or $A^6$, and one of $A^7$ or $A^8$ are each independently —O—C$(R^1(R^3))$—$R^2$, and the other in each pair is a hydrogen atom, in which $R^1$ and $R^3$ are each independently an alkyl group, a fluorine-substituted alkyl group, or a hydrogen atom, and $R^2$ is an unsubstituted phenyl group or substituted phenyl group; and said phthalocyanine compound (II) is a compound of formula (2),

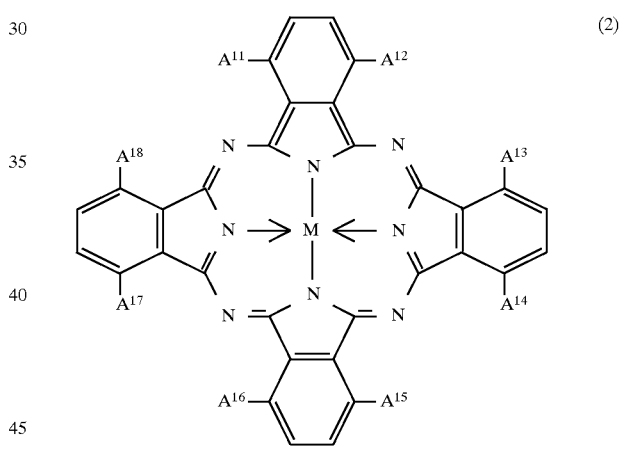

wherein M is a divalent metal atom, a mono-substituted trivalent metal atom, a di-substituted tetravalent metal or an oxy metal, one of $A^{11}$ or $A^{12}$, one of $A^{13}$ or $A^{14}$, one of $A^{15}$ or $A^{16}$, and one of $A^{17}$ or $A^{18}$ are each independently S—$R^4$ in which $R^4$ is an unsubstituted or substituted phenyl group, and the other in each pair is a hydrogen atom.

2. The optical information recording medium as claimed in claim 1, wherein the molar ratio of said phthalocyanine compound (I) of formula (1) to said phthalocyanine compound (II) of formula (2) in said light absorption layer, (I)/(II), is in a range of 1/3 to 3/1.

3. The optical information recording medium as claimed in claim 1, wherein said substituted phenyl group represented by $R^2$ is an alkyl-group-substituted phenyl group.

4. The optical information recording medium as claimed in claim 1, wherein said substituted phenyl group represented by $R^4$ is an alkyl-group-substituted phenyl group.

5. A method of producing an optical information recording medium comprising the steps of:
   providing a light absorption layer, directly or via an intermediate layer, on a substrate with information pits and/or guide grooves being on the surface thereof, by film formation coating, said light absorption layer being capable of absorbing light and comprising (a) a phthalocyanine compound (I) having a thermal decomposition temperature in a range of 250° C. to 350° C., measured by thermogravimetry with a temperature elevation rate of 10° C. and (b) a phthalocyanine compound (II) having a thermal decomposition temperature in a range of 350° C. to 450° C., measured by thermogravimetry with a temperature elevation rate of 10° C., providing a light reflection layer, directly or via an intermediate layer, on said light absorption layer by vacuum film formation, and providing a protective layer on said light reflection layer, wherein said phthalocyanine compound (I) is a compound of formula (1),

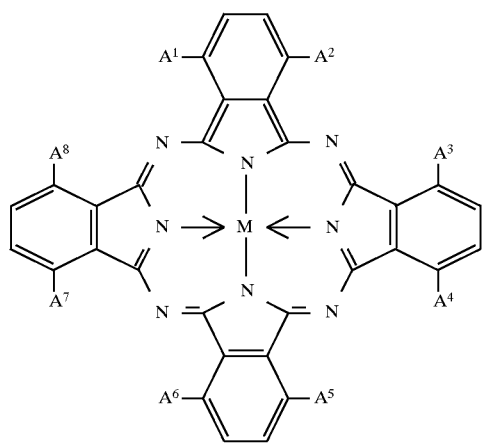

wherein M is a divalent metal atom, a mono-substituted trivalent metal atom, a di-substituted tetravalent metal or an oxy metal, one of $A^1$ or $A^2$, one of $A^3$ or $A^4$, one of $A^5$ or $A^6$, and one of $A^7$ or $A^8$ are each independently —O—C($R^1(R^3)$)—$R^2$, and the other in each pair is a hydrogen atom, in which $R^1$ and $R^3$ are each independently an alkyl group, a fluorine-substituted alkyl group, or a hydrogen atom, and $R^2$ is an unsubstituted or substituted phenyl group; and said phthalocyanine compound (II) is a compound of formula (2),

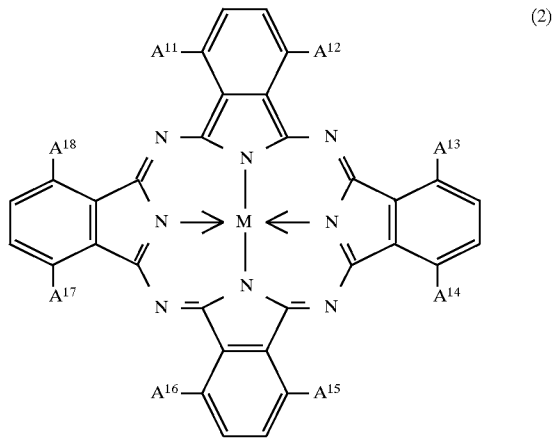

wherein M is a divalent metal atom, a mono-substituted trivalent metal atom, a di-substituted tetravalent metal or an oxy metal, one of $A^{11}$ or $A^{12}$, one of $A^{13}$ or $A^{14}$, one of $A^{15}$ or $A^{16}$, and one of $A^{17}$ or $A^{18}$ are each independently —S—$R^4$ in which $R^4$ is an unsubstituted or substituted phenyl group, and the other in each pair is a hydrogen atom.

6. The method as claimed in claim 5, wherein the molar ratio of said phthalocyanine compound (I) of formula (1) to said phthalocyanine compound (II) of formula (2) in said light absorption layer, (I)/(II), is in a range of 1/3 to 3/1.

* * * * *